United States Patent [19]

Weber et al.

[11] 4,010,359
[45] Mar. 1, 1977

[54] CIRCUIT ARRANGEMENT FOR ADDING AND SUBTRACTING

[75] Inventors: Gerald Weber, Braunschweig; Jurgen Sorgenfrei, Braunschweig-Volkmarode, both of Germany

[73] Assignee: Olympia Werke AG, Wilhelmshaven, Germany

[22] Filed: Dec. 11, 1975

[21] Appl. No.: 639,891

[30] Foreign Application Priority Data

Dec. 21, 1974 Germany ............................ 2460897

[52] U.S. Cl. ............................................... 235/169
[51] Int. Cl.² ........................................... G06F 7/50
[58] Field of Search ................... 235/169, 170, 174

[56] References Cited

UNITED STATES PATENTS

| | | | |
|---|---|---|---|
| 2,989,237 | 6/1961 | Duke | 235/169 |
| 2,991,009 | 7/1961 | Edwards | 235/169 |
| 3,089,644 | 5/1963 | Wensley | 235/169 |
| 3,189,735 | 6/1965 | Gunderson et al. | 235/169 |
| 3,304,418 | 2/1967 | Perotto et al. | 235/169 |
| 3,339,064 | 8/1967 | Koizumi et al. | 235/169 |
| 3,935,438 | 1/1976 | Grupe | 235/174 |

*Primary Examiner*—Jerry Smith
*Attorney, Agent, or Firm*—Spencer & Kaye

[57] ABSTRACT

A circuit arrangement for selectively adding or subtracting two binary coded decimal numbers exclusively by means of addition operations, in which addition involves adding a binary coded decimal value corresponding to the decimal value "6" to each digit of one of the numbers to be added and adding a binary coded decimal value corresponding to the decimal value "10" when the addition of corresponding digits of the two numbers and the value "6" does not produce a carry, and in which subtraction involves forming the unit complement to each digit of the subtrahend, adding together the unit complement of each digit, to the corresponding digit of the minuend, and a value of "1", and then adding the binary coded decimal value corresponding to the decimal value "10" when the previous addition does not produce a carry.

11 Claims, 5 Drawing Figures

CIRCUIT ARRANGEMENT FOR ADDING AND SUBTRACTING

BACKGROUND OF THE INVENTION

The present invention relates to a circuit arrangement for adding and subtracting BCD coded numerical values under control of instructions contained in a memory.

Circuit arrangements in electronic data processing systems are known to include binary adder circuits for decimal processing with which numerical values, or numbers, coded according to a BCD (binary coded decimal) code can be added and subtracted. The circuit arrangement cooperating with the binary adder circuit is constructed so that for subtractions, i.e., minuend − subtrahend = difference, the unit complement of the subtrahend is added to the minuend and to a possibly present input carry from processing of the preceding decimal digit, a 1 having been stored in the carry circuit before the start of the subtraction. By interrogating the output carry it is determined whether correction of the result is necessary. If the binary output carry is 0, a 6 must be subtracted, to correct the pseudotetrade, and this is done by the addition of a 10.

For addition problems, i.e., summand + addend = sum, the BCD values are added in the binary adder under consideration of a possible carry from previously added digits, and thereafter the result is checked for pseudotetrades. If pseudotetrades are present, a binary 6 must be added and the pseudotetrades must be generated into the carry.

These known circuit arrangements comprise a considerable amount of hardware which is particularly noticeable if the circuit is to process a plurality of numbers during one passage. The amount of hardware can, of course, be reduced by employing suitable software to process a plurality of numbers or even bits, in several passages. This, however, requires a substantial amount of time which thus makes such devices unduly slow.

SUMMARY OF THE INVENTION

It is an object of the present invention to reduce the amount of hardware required in the above-mentioned circuit arrangement without reducing its processing speed.

This and other objects according to the invention are achieved by the provision of a circuit arrangement for selectively adding or subtracting two binary coded decimal numbers, which circuit includes: at least one stage including a binary adder circuit having two inputs each arranged to receive the binary bit signals representing a corresponding decimal digit of a number to be added, and a carry circuit connected to the adder circuit; and an operation control system connected to the stage causing either an addition operation or a subtraction operation to be performed; the addition operation being performed by first adding, in the adder circuit, the signals representing the corresponding decimal digit of one of the numbers to the binary coded decimal digit representing the decimal value 6, then adding, in the adder circuit, the resulting sum valve, a carry signal present in the carry circuit and the signals representing the corresponding decimal digit of the other number and then adding, in the same adder circuit, that result to a correction value constituted by the binary coded decimal digit representing the decimal value 10 whenever no carry is produced by the preceding operation; and the subtraction operation being carried out by first adding, in the adder circuit, the binary bit signals representing a decimal digit of the number constituting the minuend, the unit complement of the binary bit signals representing the corresponding decimal digit of the other number, which constitutes the subtrahend, and the carry value present in the carry circuit, while storing any resulting carry in the carry circuit, and then adding, in the adder circuit, the result of the first addition and the correction value constituted by the binary coded decimal digit representing the decimal value 10, based on the signal present in the carry circuit.

A particular advantage of the present invention is that it eliminates the necessity of decoding pseudotetrades, and thus enables the circuitry otherwise required for this purpose to be eliminated. While previously the carry in subtractions indicated whether a +10 (corresponding to −6) had to be added and in additions a decoder had to check the result for pseudotetrades and a +6 possibly had to be added, the circuit arrangement of the present invention adds a +10 (corresponding to −6) even for additions — in dependence on the carry. Thus the process steps for addition are the same as for subtraction so that no separate circuit portions are required.

In an advantageous embodiment all process steps for additions as well as for subtractions are effected exclusively in the binary adder circuit, thus producing the effect of the correction circuits, and again no additional circuitry is required.

DESCRIPTION OF THE PREFERRED EMBODIMENTS

Figure 1:
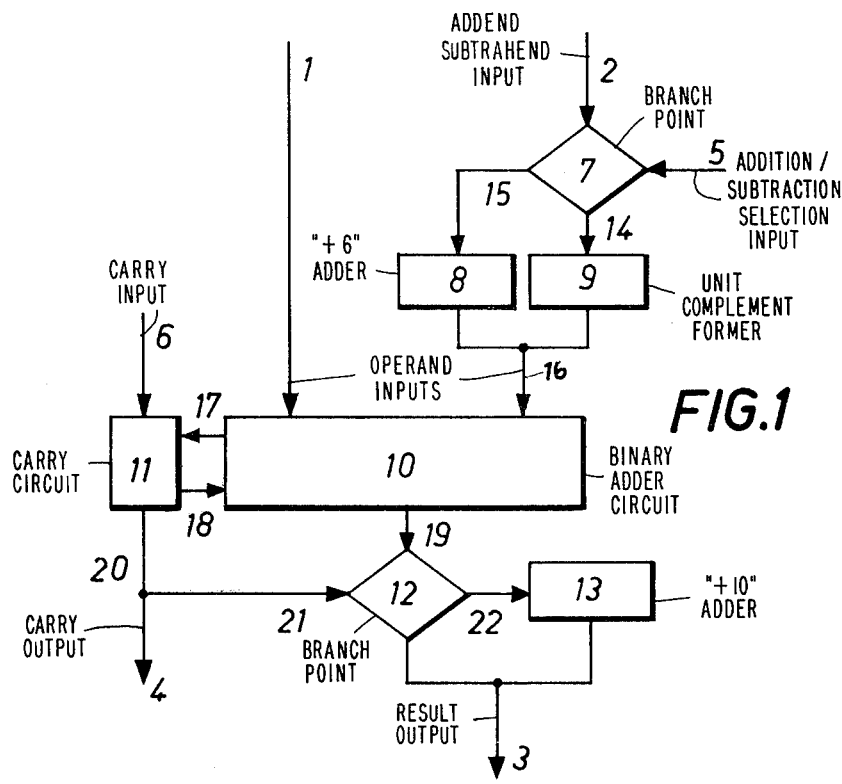
FIG. 1 is a block circuit diagram of a first embodiment of the invention.

The circuit shown in FIG. 1 includes a known binary adder circuit 10 in communication with a carry circuit 11 so that binary carries from arithmetic processes, i.e., either a binary 1 or a binary 0, can be transferred from the adder circuit 10 to the carry circuit 11 via line 17, or vice versa from the carry circuit 11 to the adder circuit 10 via line 18. The adder circuit 10 is provided with a first operand input 1 and with a second operand input 16. There is also provided an input 5 which provides a signal indicating whether the numbers present at inputs 1 and 2 are to be added or whether the number present at input 2 is to be subtracted from the number present at input 1.

The carry circuit 11 is further provided with an input 6 through which a carry value 1 to 0 can be applied from the outside. Finally, the circuit arrangement of FIG. 1 has an output 3 at which the result for the respective digit location appears and an output 4 at which a possibly present carry value for the next digit appears.

Two embodiments will be described to provide an understanding of the sequence of a digit subtraction and thereafter the sequence of a digit addition by means of the same circuit arrangement.

Digit subtraction: A BCD coded number forming the minuend in the arithmetic example is fed to input 1 and a BCD coded number forming the subtrahend is fed to input 2. While the bits of the minuend reach the adder circuit 10 without change, the bits of the subtrahend reach a decision point 7 where they are branched off to either the left data path 15 or the right data path 14 depending on whether the "addition" or "subtraction" instruction is present on 5. Since in this example a subtraction instruction is present on line 5, the subtrahend is transferred to circuit portion 9 where its unit complement is formed by inversion. This is done in a simple manner in that a binary 1 is added to every binary digit of the tetrade of the number, with possibly resulting carries from one binary digit (bit) to the next being ignored. The thus formed unit complement of the subtrahend is supplied to the adder circuit 10 via input 16.

The subtraction instruction supplied to input 5 to produce the decision signal also supplies a binary 1 to carry circuit 11 via input 6. This value, which is also called a "transient 1", is stored in circuit 11 and is fed to the adder circuit 10 via data path 18 and added to the unit complement of the subtrahend. This results in the binary complement of the subtrahend.

Now the tetrade forming the minuend and the tetrade forming the binary complement of the subtrahend are added in adder circuit 10, a possibly resulting carry is stored in carry circuit 11 via data path 17 as the output carry and the result of the addition is supplied to a decision point 12 via data path 19. If a signal path 21 which is in communication with the output 20 of the carry circuit 11 has conveyed the information to decision point 12 that a binary 1, i.e., an output carry, is stored in carry circuit 11, the addition result of this digit location is discharged as a final result via output 3. If, however, a binary 0 is stored in the carry circuit, i.e., no output carry is present, the final result goes from adder circuit 10 via data path 22 to circuit part 13, where a +10 is added as correction value. The addition of a +10 corresponds to the subtraction of a 6 in the binary system (BCD code).

The corrected and thus correct result of the subtraction of the number fed in at input 2 from the number fed in at input 1 is now discharged from circuit part 13 via output 3.

Finally, an output carry possibly contained in carry circuit 11 from the completed calculation can also be obtained from output 4 to be utilized for the processing of the next higher order digit.

The carry circuit 11 serves as a D (delay) flipflop circuit of known type which at every clock pulse is set to information states corresponding to the signal values at its D inputs. Inputs 6 and 17 here each correspond to the D input of a respective flipflop while outputs 18 and 20 constitute the respective flipflop outputs. Output 18 acts as the carry input for the binary adder circiut 10. At the beginning of a subtraction, a binary 1 is applied to carry circuit 11 via D input 6 to set the circuit to its corresponding state. This binary 1 is supplied to adder 10 via output 18 to be binary-added, in a calculating cycle, together with the unit complement of the subtrahend, applied via input 16, to the minuend, applied via input 1. At the end of the addition cycle, the resulting carry is supplied to carry circuit 11 via D input 17 and is there stored. During the subsequent correction process, this carry value stored in carry circuit 11 is delivered via flipflop output 20 and its value determines whether a correction of the binary addition result at output 19 need be effected or not.

If, on the other hand, two numbers are to be added, the summand is fed in over input 1 and the addend over input 2. An addition instruction causes transmission of a signal, via input 6, to set the carry circuit 11 to 0, and of a signal, via input 5, that causes the addend to be transferred via data path 15 into the circuit portion 8. The setting of carry circuit 11 to 0 takes place of course only at the beginning of an addition. If, however, an output carry 1 is present from the addition at the next lower order digit, the carry circuit 11 is set to 1 via input 6.

In circuit part 8 a decimal value of 6 is added to the addend. The result travels through line 16 to the adder circuit 10 where it is added to the summand and to the carry which may have been received via data path 18.

The result travels, as already described in connection with the subtraction operation, via output 19 to the decision point 12, and a resulting carry is stored in carry circuit 11 via data path 17 as the output carry. Further processing until discharge of the result and the carry, if present, is effected as described above.

In the embodiment of FIG. 1 the individual sequences are shown as separate circuit portions in the block circuit diagram. For subtraction sequences, the unit complement must be formed by inversion of the subtrahend, requiring an addition process; for addition, a 6 must be added to one of the operands in the example of FIG. 1 to the addend, as a correction value. Since both cases involve addition processes, this function can also be performed by the addition circuit 10.

If a binary 0 has been stored in carry circuit 11 as an output carry, a 10 must be added as a correction value in both cases, addition and subtraction, in order to provide the final result. This addition process can of course also be effected by the adder circuit 10.

In this case, as should be clear without detailed explanation, a 6 would be added to one of the operands, the summand or addend, in an addition process in a first passage through the binary adder circuit 10; in a second passage the operand, increased by 6, would be added in the adder circuit 10 to the remaining operands and to an input carry which might be present in carry circuit 11 from the addition of a preceding digit, if a new carry value resulted from this addition it would be stored in carry register 11 and then acts as output carry and, if the output carry in carry register 11 is 0, in a third passage the correction value 10 is added in the adder circuit. The subtraction would take place in the same manner and only the subtraction instruction at the beginning of the calculation would set the carry circuit 11 to 1 and instead of the 6 a 1 would have to be added to every binary digit in the first passage.

Figure 2:
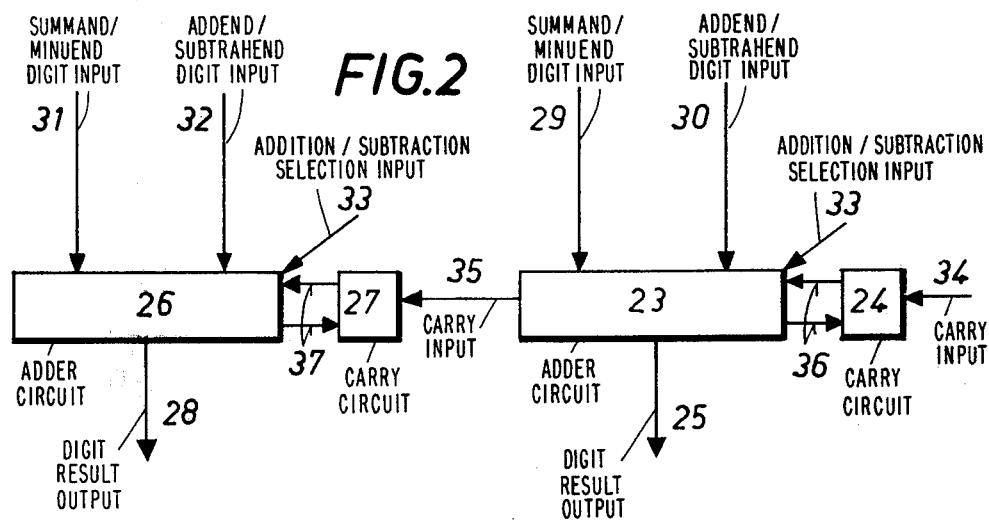
FIG. 2 is a block circuit diagram of a second embodiment of the invention.

Based on such simple type of circuit arrangement, FIG. 2 shows a further embodiment in which two digits are to be processed simultaneously, two digits being constituted by 8 bits in the BCD code. The circuit arrangement includes two adder circuits 23 and 26 which each can process digits represented by four binary bits (tetrades). Each one of these adder circuits 23, 26 is in mutual communication with an associated carry circuit 24, 27 so that carries from the adder circuit can be directed into the carry circuit, i.e., from 23 to 24 or from 26 to 27, respectively, and in the opposite direction i.e., from 24 to 23 and from 27 to 26.

If two-digit numbers are to be processed, e.g. added, the BCD coded values of the first digit to be processed are supplied to the adder circuit 23 through inputs 29 and 30, while the BCD coded values of the second digit are supplied to the adder circuit 26 through inputs 31 and 32. The condition resulting from the instruction "addition" or "subtraction", respectively, is also given to the circuit by signals supplied via input 33.

If instead of the contemplated addition, a subtraction were to be made, the carry circuit 24 would additionally be set to 1 by a signal supplied via input 34. In this case the data bits written into the adder circuits 23 and 26 would be processed in the manner described above, and in the described addition example the correction value 6 would be added to one of the operands in a first passage in both adder circuits 23 and 26 and in a second passage the operand which has been increased by addition of the 6 would be added to the remaining operand in both adder circuits 23 and 26.

A binary carry 1 resulting from the addition of the values of the first digit which may have been transferred from the adder circuit 23 via data path 36 to the carry circuit 24 and via data path 35 to the carry circuit 27 is then given via data path 37 to the adder circuit 26 and is also processed there. If a binary output carry should result from the addition process in adder circuit 26, this carry travels via data path 37 to the carry circuit 27. The carries from adder circuit 23 are then present in carry circuit 24 and those from adder circuit 26 are present in carry circuit 27. The carries are stored in carry circuits 24 and 27 after being processed in the second passage for the purpose of creating a criterion determining whether or not a correction value of 10 should be added in the manner described with reference to FIG. 1 in a third passage through one or both of the adder circuits 23 and 26 in order to produce the correct output result.

The example of FIG. 2 shows that with simultaneous processing of two figures the savings in circuitry are already doubled without increasing the time required for such processing.

The following two examples will help to explain the operation of the circuit arrangement of FIG. 2.

```
1. Subtraction:      81 - 49 = 32
   Minuend           L O O O              O O O L   Inputs 31 and 29
   subtrahend        O L O O              L O O L   inputs 32 and 30 inverting of      O L O O              L O O L
   subtrahend        L L L L              L L L L unit complement   L O L L              O L L O
   input carry      +O O O O             +O O O L   from carry circuits
   minuend          +L O O O             +O O O L      27 and 24
                     O O L L              L O O O
   carry and
   output condition     L                    O      in carry circuits
                                                       27 and 24
   correction  ────>10
                                         +L O L O
   Result            O O L L              O O L O   to outputs 28 and 25

2. Addition:         93 + 62 = 155; the 1 in the hundreds position
                     of the result is present in the carry circuit for
                     processing in the stage for the next higher order
                     digit.
   Summand           L O O 1
   addend            O L L O              O O L L   inputs 31 and 29
                                          O O L O addend            O L L O              O O L O
   correction 6     +O L L O             +O L L O
                     L L O O              L O O O
   summand          +L O O L             +O O L L   from carry circuits
   input carry      +O O O O             +O O O O      27 and 24
                     O L O L              L O L L
   carry and
   output condition     L                    O      in carry circuits
                                                       27 and 24
   correction  ────>10
                                         +L O L O
   Result            O L O L              O L O L   to outputs 28 and 25
```

Figure 3:
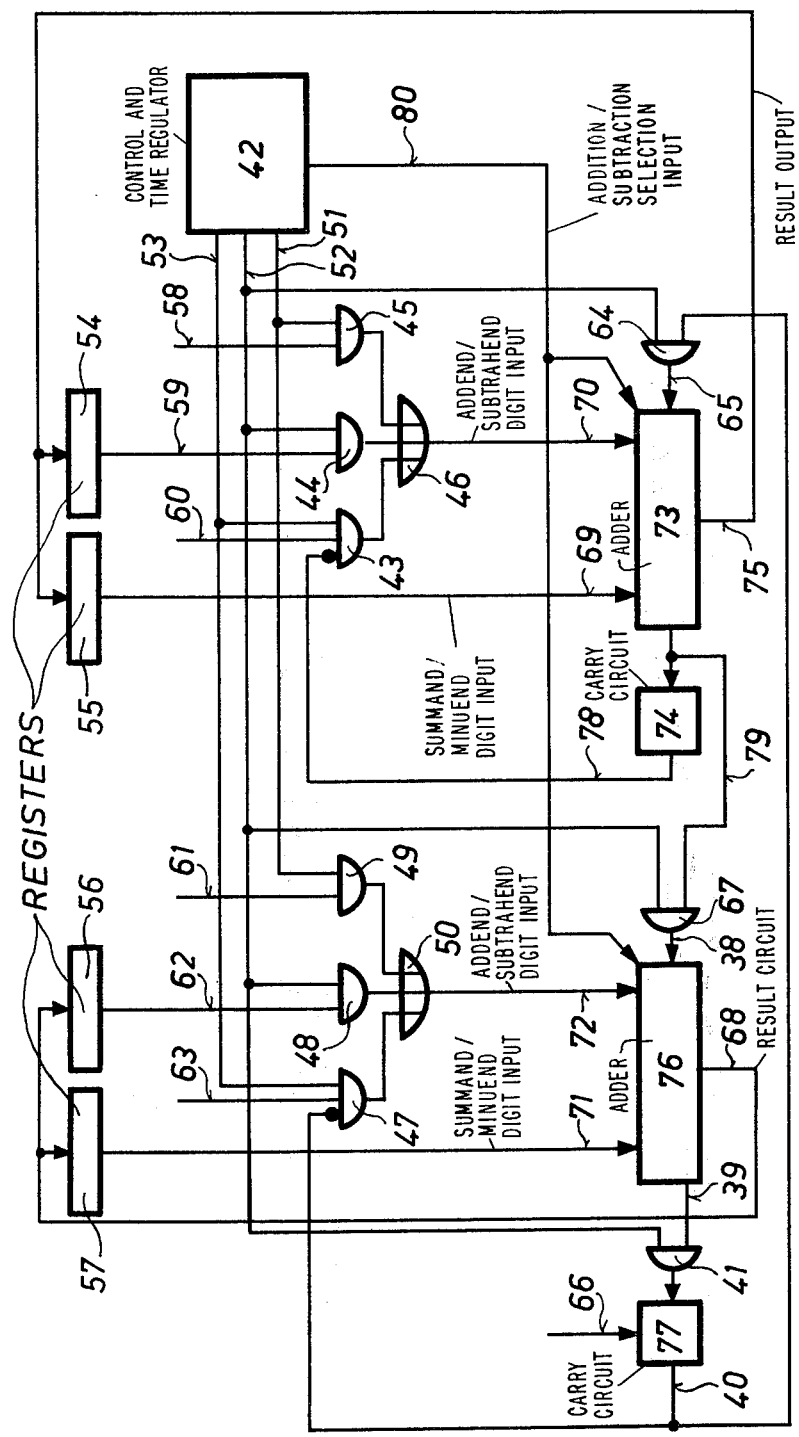
FIG. 3 is a block circuit diagram of a complete circuit corresponding to the embodiment of FIG. 2.

FIG. 3 is a block circuit diagram of a complete circuit arrangement corresponding to the embodiment shown in FIG. 2. The circuit includes two adder circuits 73 and 76 which can each process a 4 bit tetrade. Here, too, the adder circuits 73, 76 are associated with respective carry circuits 74 and 77 connected to store the output from the adder circuits. In order to facilitate understanding of the operation of the circuit, the sequence of an addition as well as that of a subtraction will be described together with a description of the other circuit components of FIG. 3.

The following description relates to the simultaneous addition of two BCD coded numbers each having two decimal digits. The addition process takes place in three successive cycles. The control of the individual addition cycles is effected by the control and time regulator 42 applying control signals via lines 80, 51, 52 and 53. The operands to be added are present in registers 54, 55, 56 and 57, i.e., the lower-order digit of the addend is in 54, the higher-order digit of the addend is in 56, the lower-order digit of the summand is in 55 and the higher-order digit of the summand is in 57.

During the first addition cycle, the correction value "+6" is added to the summand. For this purpose, adder circuits 73 and 76 receive the respective summand digits at their inputs 69 and 71, respectively, while the correction values "+6", a programmed constant, are fed in via inputs 58 and 61, respectively, by AND gates 45 and 49, respectively, and via OR gates 46 and 50, respectively, to the other inputs 70 and 72, respectively, of adder circuits 73 and 76. The signal required for switching through the correction value is furnished by the control and time regulator 42 via line 51. This regulator also provides a signal, via line 80, which indicates to the adder circuits 73 and 76 that a binary addition is to be performed. The summand digits which have now been increased by +6 pass through the outputs 75 and 68, respectively, of the adder circuits back to registers 55 and 57, respectively, completing the first addition cycle.

During the course of the first cycle, the output carry at outputs 79 and 39 will always be a 0. Storage of this 0 in carry circuit 77 is prevented by a gate 41 which is blocked by a 0 value signal applied via line 52. Storage of the carry 0 in carry circuit 74 is of no significance.

During the second addition cycle, a control signal value 1 is present on line 52. This connects the outputs 59 and 62 of registers 54 and 56, via AND gates 44 and 48 and OR gates 46 and 50 to the inputs 70 and 72 of adder circuits 73 and 76, respectively. The summand digits, increased by +6, pass through inputs 69 and 71 to adder circuits 73 and 76. A control signal on line 80 gives the instruction for "binary addition" to addition circuits 73 and 76.

Thus, during the second addition cycle, the summand increased by +6 is binary-added to the addend. The result of this binary addition is conducted via outputs 75 and 68, respectively, to registers 55 and 57, respectively, and there stored.

At the end of the second addition cycle, the carries at outputs 79 and 39, respectively, are stored in the flip-flops of the carry circuits 74 and 77, respectively. The switching through of the output carry on line 39 is effected by the control signal in line 52, which makes AND gate 41 conductive. The control signal in line 52 also enables AND gate 67 to conduct the output carry signal in line 79 to the carry input 38 of the higher-order adder circuit 76. The signal constituting the input carry for adder circuit 73 during the second addition cycle is furnished by carry circuit 77 via line 40 and an AND gate 64. This signal is switched through to the carry input 65 by the control value 1 in line 52, which makes AND gate 64 conductive.

It should be noted that at the beginning of an addition, carry circuit 77 must have received an instruction via input 66 to be set to 0 for the first two digits of a number. During the addition of the next digits, the binary carry generated during the second addition cycle, which has been stored in carry circuit 77, is utilized as an input carry for the adder circut 73.

In dependence on the output carries generated during the second addition cycle, the intermediate result stored in registers 54 and 56 is corrected in a third addition cycle. During the third addition cycle, a control signal value appears on line 53. The fixed, i.e. hard-wired, correction constants +10 are fed in to AND gates 43 and 47, respectively, via inputs 60 and 63, respectively. These constants are switched through via gates 43 and 46 or 47 and 50, respectively, only if the contents of respective carry circuits 74 or 77 equal 0. If the contents of carry circuit 74 and/or 77, whose respective outputs 78 and 40 are fed in negated form to respective gates 43 and 47, equal 1, the respective gate 43 or 47 remains blocked so that instead of the contants +10, a 0 is fed to the respective adder circuit input 70 or 72. Processing or storage of the carry is prevented by the absence of a control signal in line 52, with the result that gates 64, 67 and 41 remain blocked so that the adder circuits 73 and 76 each receive a 0 at their carry inputs 65 and 38. Storage of a carry in carry circuit 77 is also prevented. The addition result is stored in registers 54 and 56 at the end of the third cycle.

Subtraction of a two-digit subtrahend from a two-digit minuend takes place in a manner similar to addition. At the beginning of the subtraction, the carry circuit 77 must be set to 1 by an instruction applied via input 66. The respective minuend is present in registers 54 and 56 and the subtrahend in registers 55 and 57.

During the first subtraction cycle, a control signal is active on line 51. At the same time, the control signal in line 80 switches the adder circuits 73 and 76 to the "Exclusive Or" mode. A constant 15, which is a programmed constant, is fed to gate inputs 58 and 61 and switched through to the inputs 70 and 72 of the adder circuits. The Exclusive Or mode with the constant 15 complements the subtrahend digits present at inputs 69 and 71 of adder circuits 73 and 76. The resulting unit complement is delivered to registers 55 and 57 for storage, via respective outputs 75 and 68. This completes the first subtraction cycle. The two subsequent cycles are identical to the above described second and third addition cycles.

Figure 4:
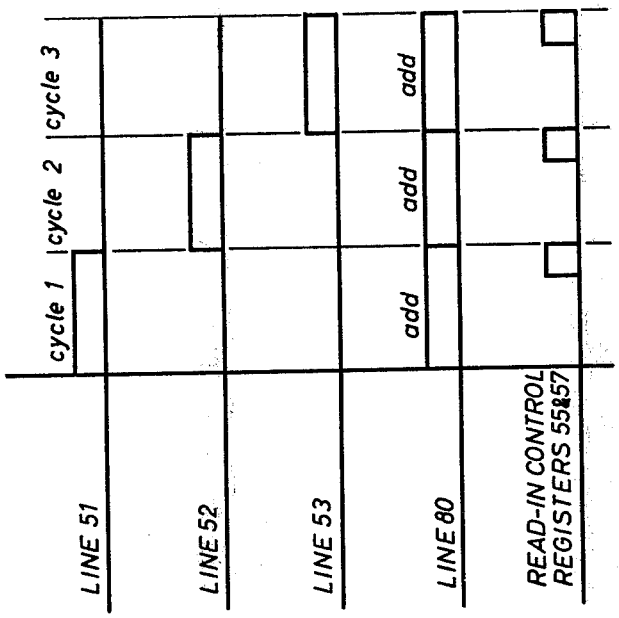
FIG. 4 is a pulse diagram illustrating the control pulses during an addition operation of the embodiment of FIG. 3.

FIG. 4 shows the time relation between the control pulses during an addition operation in a circuit corresponding to FIG. 3. The uppermost line shows the pulse train supplied by control and time regulator 42 to line 51 during the first operation cycle 1. This pulse causes switching through of the correction value +6. The second line shows the pulse train supplied by control and time regulator 42 to line 52. This pulse furnishes AND gates 44, 48, 64, 67 and 41 with input signals during the second operation cycle. The third line shows the pulse train supplied by control and time regulator 42 to line 53. AND gates 43 and 47 are thereby furnished with an input signal during operation cycle 3, thus causing the switching through of the correction value +10 if the contents of the carry circuits 74 or 77 equal 0. The fourth line shows the pulse train supplied by control and time regulator 42 to line 80. It is seen that in cycles 1, 2 and 3 a signal is provided, which indicates to the adder circuits 73 and 76 that a binary addition is to be performed. Finally, the lowermost line of FIG. 4 shows the control pulses supplied to registers 55 and 57, respectively, to control their read-in operations. These pulses cause that, at the end of operation cycle 1, 2 and 3, respectively, the results are read-in from outputs 75 and 68 into registers 55 and 57, respectively. The control pulses shown in the lowermost line are supplied either by control and time regulator 42 or by another suitable unit, not illustrated, to registers 55 and 57.

Figure 5:
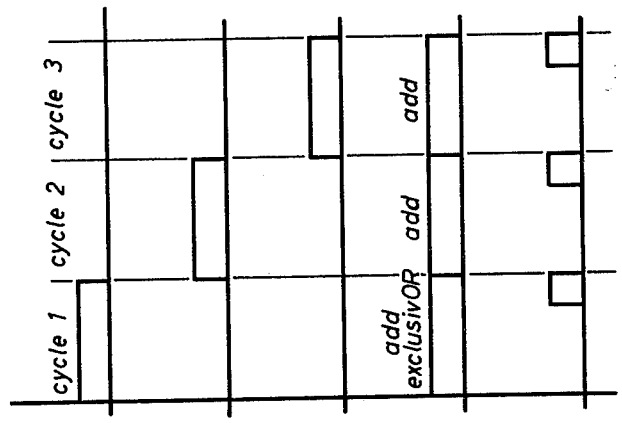
FIG. 5 is a pulse diagram illustrating the control pulses during a subtraction operation of the embodiment of FIG. 3.

FIG. 5 shows the time relation between the control pulses during a subtraction operation in a circuit corresponding to FIG. 3. It is seen that the pulse trains are equal to those of FIG. 4. Only the pulse supplied to line 80 during the first cycle differs. It switches the adder circuits 73 and 76 to the Exclusive Or mode.

It will be understood that the above description of the present invention is susceptible to various modifications, changes and adaptions, and the same are intended to be comprehended within the meaning and range of equivalents of the appended claims.

What is claimed is:

1. A circuit arrangement for selectively adding or subtracting two binary coded decimal numbers, said circuit comprising: a plurality of stages each associated with a different respective order decimal digit and each including a binary adder circuit having two inputs each arranged to receive the binary bit signals representing a corresponding decimal digit of a number to be added, and a carry circuit connected to said adder circuit; and operation control means connected to each said stage for causing at least one of an addition operation and a subtraction operation to be carried out simultaneously in all said stages; the addition operation being performed, in each said stage, by first adding, in said adder circuit, the signals representing the corresponding decimal digit of one of the numbers to the binary coded decimal digit representing the decimal value 6, then adding, in said adder circuit, the resulting sum value, a carry signal present in said carry circuit, and the signals representing the corresponding decimal digit of the other number, and then adding, in said adder circuit, that result to a correction value constituted by the binary coded decimal digit representing the decimal value 10 whenever no carry is produced by the preceding addition, and the subtraction operation being carried out, in each said stage, by first adding, in said adder circuit, the binary bit signals representing a decimal digit of the number constituting the minuend, the unit complement of the binary bit signals representing the corresponding decimal digit of the other number, which constitutes the subtrahend, and the carry value present in said carry circuit, while storing any resulting carry in said carry circuit, and then adding, in said adder circuit, the result of the first addition and the correction value constituted by the binary coded decimal digit representing the decimal value 10, based on the signal in said carry circuit.

2. An arrangement as defined in claim 1 wherein for a subtraction operation said control means causes, in each said stage, such unit complement to be formed by preliminarily causing the binary bit signals representing the corresponding decimal digit of the subtrahend to pass through said adder circuit and be inverted.

3. An arrangement as defined in claim 2 wherein, for performing a subtraction operation, in each said stage one of the inputs of the adder circuit constitutes a minuend input and the other one of the inputs of the adder circuit constitutes a subtrahend input, and said operation control means generate a succession of control signals producing, in sequence: a first cycle in which the decimal digit of the subtrahend are applied to the subtrahend input of the adder circuit, a first clock pulse signal effects delivery of the constant value +15 to the minuend input of the adder circuit, the adder circuit is set to the add/EXCLUSIVE OR mode by a condition input signal; a second cycle in which the intermediate result produced in the adder circuit is fed to the subtrahend input of the adder circuit, a second clock pulse signal effects delivery of the contents of the carry circuit, which had been set to 1 at the beginning of the subtraction process by an instruction signal to the carry input of the next lower order digit adder circuit and causes the corresponding decimal digit of the minuend to be applied to the minuend input of the adder circuit, the adder circuit is set by a condition input signal to the add mode, and the resulting carry is applied to the carry input of the next higher order adder circuit; and a third cycle in which the result at the output of the adder circuit is fed to the subtrahend input thereof, a third clock pulse signal effects delivery of the constant value +10 to the minuend of the adder circuit if the switch-through condition "carry in associated carry circuit = 0" is met, the adder circuit is set by a condition input signal to the add mode, and the end result appears at the output of the adder circuit.

4. An arrangement as defined in claim 3 wherein the first cycle includes setting the carry circuit to 1 at the beginning of the cycle by means of the instruction signal, and feeding the output signal from the carry circuit to the carry input of the next lower order adder circuit under control of a clock pulse signal.

5. An arrangement as defined in claim 1 wherein, for performing an addition operation in each said stage, said operation control means generate a succession of control signals for producing, in sequence; a first adding cycle in which the corresponding decimal digit of one of the numbers is applied to one input of the adder circuit, a first cock pulse signal effects delivery of the constant value +6 to the other input of the adder circuit, the adder circuit is set to the add mode by a condition input signal, and the result of the addition is stored; a second adding cycle in which that addition result is applied to the one input of the adder circuit, a second clock pulse signal effects delivery of the contents of the carry circuit which had been set to 0 at the beginning of the addition process by an instruction signal to the carry input of the next lower order digit adder circuit, and causes corresponding decimal digit of the other number to be applied to the other input of the adder circuit, the adder circuit is set by a condition input signal to the add mode, and the resulting carry is applied to the carry input of the next higher order adder circuit; and a third adding cycle in which the summing result is fed to the one input of the adder circuit, a third clock pulse signal effects delivery of the constant value +10 to the other input of the adder circuit if the switch-through condition "carry in the carry circuit = 0" is met, the adder circuit is set by a condition input signal to the "add" mode, and the end result appears at the output of the adder circuit.

6. An arrangement as defined in claim 5 wherein the first cycle includes setting the carry circuit to "0" at the beginning of the cycle by means of the instruction signal, and feeding the output signal from the carry circuit to the carry input of the next lower order adder circuit under control of a clock pulse signal.

7. An arrangement as defined in claim 1 wherein: there are at least two of said stages each associated with a different respective order decimal digit, one of said stages being associated with the highest order digit; each said adder circuit has a carry input and a carry output; each stage comprises an AND gate whose output is connected to the carry input of its respective adder circuit; the carry output of said adder circuit of each said stage other than that associated with the highest order decimal digit being connected to one input of the AND gate of the next higher order adder circuit and to its associated carry circuit; said arrangement additionally comprises a further AND gate having one input connected to the carry output of the highest order stage digit adder circuit and having its output connected to the carry circuit of said highest order stage; the output of said highest order stage carry circuit is connected to one input of said AND gate of the lowest order digit stage; the carry circuit of said highest order stage is settable and resettable by instruction signals; and said AND gates and further AND gate are each provided with a second input connected to receive clock pulse signals.

8. An arrangement as defined in claim 1 wherein said operation control means provides signals for switching said adder circuit between the add mode and the "add-/Exclusive Or" mode.

9. A circuit arrangement for selectively adding or subtracting two binary coded decimal numbers, said circuit comprising: at least one stage including a binary adder circuit having two inputs each arranged to receive the binary bit signals representing a corresponding decimal digit of a number to be added, and a carry circuit connected to said adder circuit; and operation control means connected to said stage for causing at least one of an addition operation and a subtraction operation to be carried out; the addition operation being performed by first adding, in said adder circuit, the signals representing the corresponding decimal digit of one of the numbers to the binary coded decimal digit representing the decimal value 6, then adding, in said adder circuit, the resulting sum value, a carry signal present in said carry circuit, and the signals representing the corresponding decimal digit of the other number, and then adding, in said adder circuit, that result to a correction value constituted by the binary coded decimal digit representing the decimal value 10 whenever no carry is produced by the preceding addition, and the subtraction operation being carried out by first adding, in said adder circuit, the binary bit signals representing a decimal digit of the number constituting the minuend, the unit complement of the binary bit signals representing the corresponding decimal digit of the other number, which constitutes the subtrahend, and the carry value present in said carry circuit, while storing any resulting carry in said carry circuit, and then adding, in said adder circuit, the result of the first addition and the correction value constituted by the binary coded decimal digit representing the decimal value 10, based on the signal in said carry circuit, and wherein said stage further comprises: an OR gate having its output connected to that input of said adder circuit which constitutes the minuend input for the subtraction operation, said OR gate having a plurality of inputs; and a plurality of AND gates each having its output connected to a respective one of said inputs of said OR gate, a first one of said AND gates having an input connected to receive signals representing selected constant decimal values, a second one of said AND gates having a data input connected to receive the binary bit signals representing a decimal digit to be added in an addition operation or the minuend in a subtraction operation, and a third one of said AND gates having a first input connected to receive the negated version of the output signal from said carry circuit and a second input connected to receive signals representing the decimal value +10, and said operation control means has a plurality of clock pulse outputs with each of said AND gates having a gating input connected to one of said clock pulse outputs.

10. An arrangement as defined in claim 9 wherein there are three of said AND gates and the selected constant decimal value is +6 for an addition operation and +15 for a subtraction operation.

11. An arrangement as defined in claim 9 wherein said stage further comprises two registers for receiving and transferring operands and intermediate results, one of said registers having its output connected to that input of said adder circuit which constitutes the subtrahend input for the subtraction operation, and the other one of said registers having its output connected to said data input of said second AND gate, the inputs of said registers being connected with the output of said adder circuit.

* * * * *